United States Patent [19]
Wolf

[11] 3,724,780
[45] Apr. 3, 1973

[54] CASSETTE LOADING MAGNETIC TAPE DRIVER

[75] Inventor: Richard N. Wolf, North Billerica, Mass.

[73] Assignee: Memodyne Corporation, Newton, Mass.

[22] Filed: July 23, 1971

[21] Appl. No.: 165,663

[52] U.S. Cl. ..................................242/206, 274/11 D
[51] Int. Cl. ..........................B11b 15/32, G03b 1/04
[58] Field of Search ..............242/201–206, 197–200, 242/67.2; 274/4 C, 4 E, 11 R, 11 D

[56] References Cited

UNITED STATES PATENTS 3,604,714 9/1971 Staar ....................................274/4 E
3,625,458 12/1971 Fischer et al. ........................242/201

*Primary Examiner*—Leonard D. Christian
*Attorney*—Herbert W. Kenway et al.

[57] ABSTRACT

A cassette loading magnetic tape drive system utilizing a stepping motor directly coupled to a capstan shaft which cooperates with a pinch roller to provide tape drive. The same stepping motor drives a slip clutch through a transfer roller, the slip clutch providing controlled torque to a cassette reel and controlled tension on the tape through a resilient driver hub which engages all splines of the cassette reel. Stepping motion is transferred from the motor only when the entire system is in operation.

4 Claims, 5 Drawing Figures

INVENTOR
RICHARD N. WOLF
BY Kenway, Jenney & Hildreth
ATTORNEYS

CASSETTE LOADING MAGNETIC TAPE DRIVER

FIELD OF THE INVENTION

This invention relates in general to magnetic tape drives and more particularly to a cassette loaded tape drive providing precision tape motion for digital applications.

Attempts to utilize magnetic tapes in cassettes for computer applications requiring incremental tape motion have encountered serious difficulties due to erratic tape motion both during the tape motion portion of the drive cycle and during the stop portion of the cycle. In most such systems, when the head is in the engaged position, the tape is in motion, usually provided by a synchronous motion tape drive which would desirably operate at a continuous rate usually greater than 3 IPS and not more than 15 IPS.

In the past, the reel take-up mechanisms for the tape have generally been either of two types. One type employs an elastic belt coupling a motor to a spline drive hub which engages the conventional internal spline on a cassette reel to take up the tape. A second method involves the use of a motor coupled directly to the take-up reel hub engaging the conventional internal spline on the cassette reel. The tape movement provided by these systems is not sufficiently precise to allow for true bit-by-bit incremental motion for computer applications. Some of the problems encountered during the motion portion of the cycle are caused by jitter which is due to the spacing between the splines on the drive hub and the internal splines on the cassette reel. In belt drive systems, on the other hand, belt stretch can introduce significant accuracy problems. In both of these prior art systems, operated incrementally, acceleration from the stop tape mode to the moving tape mode is slow. Moreover, an overshoot in the acceleration curve which is the uncertain shape is common. Hence, during a relatively high proportion of the total time period from the initiation to the termination of incremental motion, it is not possible to reliably recover recorded data.

BRIEF SUMMARY OF THE INVENTION

Broadly speaking, in the present invention, the tape drive system is coupled to a stepping motor by means of a coupling system which is either completely engaged or completely disengaged. The coupling system includes a capstan shaft driven by the stepping motor and a pinch roller for providing the tape drive, the latter roller engaging the capstan shaft only when the read-write head is in the operating position. The take-up reel is positively coupled to the capstan shaft through a transfer roller which couples the capstan shaft and a slip clutch, the latter coupling to a driver hub which engages the splines on the cassette reel. The driver hub does not have splines, but is rather formed with a precision neoprene rubber ring of external diameter sufficient to form a positive frictional engagement with the internal splines on the cassette reel. Relative motion between the slip clutch and the driver hub shaft is available in the slip clutch to provide for positive tension as the tape reel diameter changes but without sufficient force to impart excessive tension to the tape.

The transfer roller coupling the slip clutch to the capstan shaft is mechanically engaged simultaneously with the pinch roller being engaged with the capstan shaft and is similarly disengaged when the pinch roller is disengaged. Thus, both tape motion and take-up reel tension are derived from the same stepping motor and, the take-up reel tensioning system being completely disengaged in the stop mode, no problem of slippage in the stop mode is encountered. Furthermore, because the precision rubber ring engages positively at all times the internal splines of the cassette, the error and jitter associated with a splined hub is eliminated.

DESCRIPTION OF THE PREFERRED EMBODIMENTS

Figure 1:
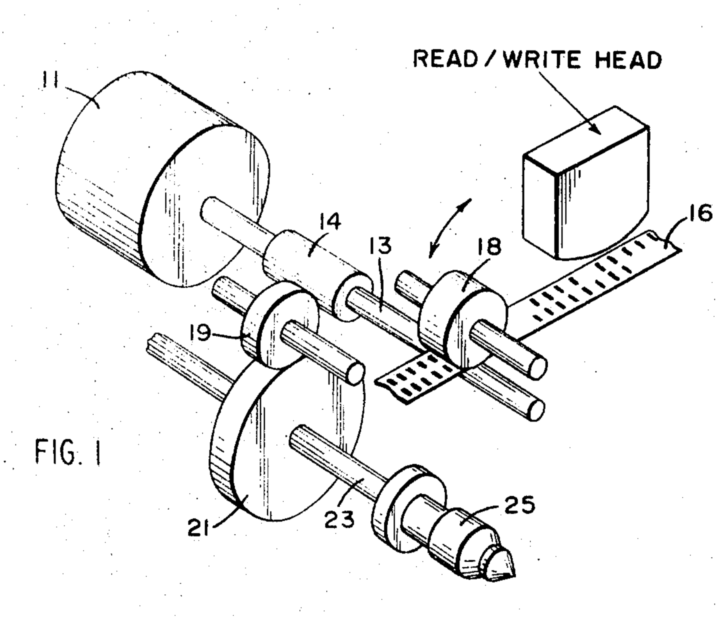
FIG. 1 is a fragmentary perspective view of a tape drive system embodying principals of this invention.

With reference now to FIG. 1, the illustrated drive system has as its power source a stepping motor 11 capable of being stepped at rates which may vary from one to one thousand steps per second. The stepping motor output is in the form of rotation of a capstan shaft (13) which passes under a magnetic tape (16). A rotatable pinch roller (18) is pivotally mounted to permit it to provide constant spring tension against the capstan shaft (13) as indicated by the double-ended arrow. In the operating, or engaged, position the pinch roller presses the tape against the capstan shaft, thereby causing the tape to move with rotation of the capstan shaft. The pinch roller is engaged only when the head is down, that is, only when the head is in the read or write position and, correspondingly, the pinch roller is disengaged when the head slide is in the up or non-operative position.

The capstan shaft (13) is also positively mechanically coupled through a transfer roller 19 and a shaft coupling 14 to a slip clutch 21. The same mechanical linkage serves to move the transfer roller 19 into and out of engagement with the capstan shaft coupling 14 and the slip clutch 21 and also the pinch roller 13 into and out of engagement with the capstan shaft. Thus, when the pinch roller is engaged with the capstan shaft, the transfer roller is also engaged with the capstan shaft coupling and slip clutch. Conversely, when the pinch roller is disengaged, so also is the transfer roller 19. The slip clutch 21 performs the function of coupling torque from the stepping motor 11 to the take-up reel on a magnetic tape cassette. The rotational speed of the transfer roller 19 and the torque on the slip clutch 21 is arranged so that sufficient force is transmitted to maintain a positive tension on the magnetic tape 16 at the take-up reel, thereby eliminating folds or the like in the tape between the pinch roller and the take-up reel and also providing for proper wind-up of the tape in the reel. This tension is not sufficient however to produce any motion of the tape other than that supplied by the capstan and pinch roller. The slip clutch 21 engages a shaft 23 supporting a driver hub 25 which engages the internal splines of the take-up reel on the magnetic tape cassette.

Figure 2:
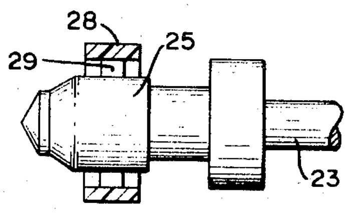
FIG. 2 is a side view of the drive hub of the system illustrated in FIG. 1.
Figure 3:
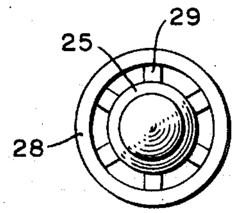
FIG. 3 is a sectional end view of the drive hub of FIG. 2.

The construction of the driver hub 25 and the manner in which it engages with the internal splines on the take-up reel is more clearly shown in FIGS. 2 and 3. Referring to FIG. 2, the hub 25 is in the form of a precision resilient member mounted on the shaft 23 and having dual tapered sections at its terminating end. The member 25 is typically formed of neoprene rubber with a precise outer diameter at the cylindrical or ring sections to match the outer diameter of the opening formed by the series of internal splines 29 on the take-up reel 28. This rubber ring therefore engages the splines with a positive friction engagement so that, with the cassette in place there can be no relative movement between the shaft 23 and the reel 29. The final tapered section comes to a point to permit entry of the hub into the splines 29 without damage to the hub or splines.

The tolerance on the precision rubber ring must be at least equal to the tolerances of the cassette manufacturers on the opening formed by the internal splines 29. Typically, for a precision rubber ring of 0.300 inches the tolerance would be +0.005 inches and − 0.0 inches.

Figure 4:
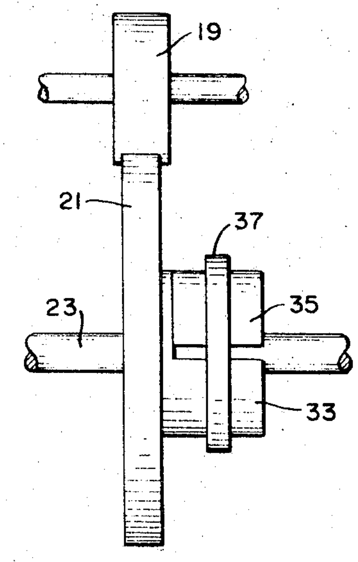
FIG. 4 is a side view of the slip clutch of the system illustrated in FIG. 1.
Figure 5:
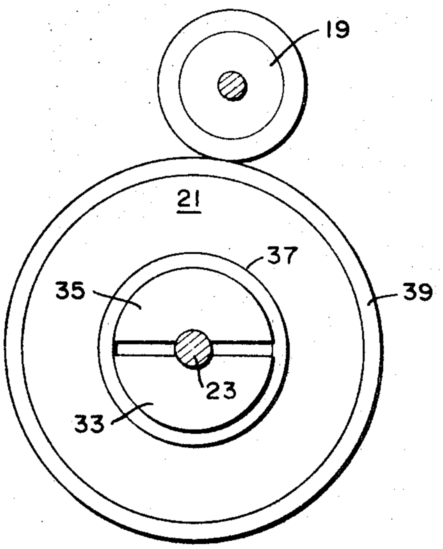
FIG. 5 is a sectional end view of the slip clutch of FIG. 4.

A suitable construction for the slip clutch 21 is illustrated in FIGS. 4 and 5. The slip clutch is formed of a disk 21 having a friction ring 39 around its periphery, the latter typically being formed of neoprene rubber. The disk 21 includes a smaller diameter concentric disk portion 33 fixed to it, with a portion 35 of the smaller disk 33 being split from it. The portion 35 and the portion 33 of the smaller diameter disk are formed so that there is a gap between the two sections when placed together. An elastic grip ring 37 surrounds the two portions and provides the tensioning force to engage the shaft 23 with the two portions of the disk 33, thereby providing for a controlled tension engagement between the slip clutch disk 21 and the shaft 23 which drives the take-up reel hub 25. By proper selection of the elasticity and dimensions of the elastic grip ring 37, an appropriate tension may be provided. The inner disk 33 may be formed of any suitable material, a hard plastic such as that sold by E. I. duPont under the trade name Delrin being satisfactory.

The tape drive system described above may be operated either in the incremental mode or in the continuous mode. The incremental mode is produced by driving the stepping motor at speeds generally less than 250 steps per second, while at speeds higher than this, an effectively continuous tape motion is produced. With the tape drive of this invention, the write operation may be conducted, for example, in the incremental mode at a bit speed of 110 bits per second, and the read mode may be identical, or it may be operated at a much higher speed, for example, 300 bits per second.

The tape drive described can be operated in a generally conventional tape recording system, utilizing conventional recording techniques, read-write heads and magnetic tape cassettes.

I claim:

1. A drive system for providing precision controlled motion to a magnetic tape contained in a cassette including an internally splined take-up reel, said drive system comprising a capstan shaft positioned in generally rotating engagement with said magnetic tape;

a stepping motor providing rotational motion to said capstan shaft;

a pinch roller having a first position in engagement with said magnetic tape for pressing said magnetic tape against said capstan shaft and a second position out of engagement with said magnetic tape;

a driver hub for frictionally engaging the internal splines on said cassette reel, said driver hub being formed of a precision rubber ring of diameter to precisely match the diameter of the opening formed by said internal splines;

a disengageable coupling train having a first condition in which said driver hub is coupled to said capstan shaft and a second position in which said driver hub is decoupled from said capstan shaft, said coupling means including a slip clutch adjusted to provide tensioning force to said driver hub insufficient to rotate said take-up reel, said coupling means being controlled to be in said engaged condition only when said pinch roller engaging said magnetic tape.

2. A drive system in accordance with claim 1 wherein said coupling means coupling said driver hub and said capstan shaft includes a transfer roller movable into a first position coupling said capstan shaft to said slip clutch and out of said first position into a second position in which there is no coupling between said capstan shaft and said slip clutch.

3. A drive system in accordance with claim 2 wherein said coupling means drives said driver hub and has sufficient tensioning force to maintain a positive tension on said tape through said take-up reel.

4. A drive system for magnetic tape contained in a cassette having an internally splined take-up reel comprising:

a stepping motor;

a capstan shaft rotatably driven by said stepping motor;

a pinch roller for engaging said magnetic tape in cooperation with said capstan shaft;

an auxiliary shaft disposed for rotation about an axis parallel to that of said capstan shaft;

a driver hub mounted on said auxiliary shaft and engaging resiliently the internal splines of said take-up reel;

means including a slip clutch coupling said capstan shaft to said auxiliary shaft to impart controlled torque to said take-up reel and controlled tension to said tape; and means mounting said pinch roller and said means for coupling said capstan shaft to said auxiliary shaft for simultaneous movement to permit disengagement of said pinch roller from said tape and disengagement of said slip clutch from said capstan shaft.

* * * * *